United States Patent
Tompkins et al.

(10) Patent No.: US 10,726,394 B2
(45) Date of Patent: Jul. 28, 2020

(54) SYSTEM AND METHOD FOR SCHEDULING APPOINTMENTS

(71) Applicant: Dynamic Medicine LLC, Boston, MA (US)

(72) Inventors: Ronald G. Tompkins, Boston, MA (US); Andrew K. Alexander, Concord, MA (US); Ulysses G. J. Balis, Ypsilanti, MI (US)

(73) Assignee: Dynamic Medicine LLC, Boston, MA (US)

( * ) Notice: Subject to any disclaimer, the term of this patent is extended or adjusted under 35 U.S.C. 154(b) by 625 days.

(21) Appl. No.: 15/217,120

(22) Filed: Jul. 22, 2016

(65) Prior Publication Data

US 2017/0024704 A1 Jan. 26, 2017

Related U.S. Application Data

(60) Provisional application No. 62/196,126, filed on Jul. 23, 2015, provisional application No. 62/253,337, filed on Nov. 10, 2015.

(51) Int. Cl.
  *G06Q 10/10* (2012.01)
  *G06Q 10/00* (2012.01)
(52) U.S. Cl.
  CPC ................ *G06Q 10/1095* (2013.01)
(58) Field of Classification Search
  CPC ................................................ G06Q 10/1095
  (Continued)

(56) References Cited

U.S. PATENT DOCUMENTS 6,389,454 B1 5/2002 Ralston et al.
7,865,386 B2 1/2011 Sarkar
(Continued)

OTHER PUBLICATIONS

Zhang Yongjun, Web-Based Network Management System Revolving About Database Key Laboratory of Optical Communication and Lightwave Technologies, Ministry of Education Beijing University of Post and Telecommunications Beijing, P.R.China. International Seminar on Business and Information Management (Year: 2008).*
(Continued)

*Primary Examiner* — Matthew S Gart
*Assistant Examiner* — Abdallah A El-Hage Hassan
(74) *Attorney, Agent, or Firm* — Morse, Barnes-Brown & Pendleton, P.C.; Sean D. Detweiler, Esq.

(57) ABSTRACT

A system and method are provided for scheduling, calendaring, notifying, and providing automated real-time updating of scheduled appointment times on a central master schedule. The system and method dynamically optimize a number of appointments being scheduled within a range of time using a distributed computing system suitable for providing a self-service model for patient driven scheduling of appointments. Specifically, the system optimizes scheduled appointment times in response to a break in the schedule or a manual update of a specific scheduled appointment to maximize the number of appointments capable of being scheduled within a defined work day for the service provider. A plurality of edge-connected devices act as the initiators of scheduling changes, while creating an edge-connected schema for handling elastic scheduling tasks that are reflected on the centrally placed master calendar residing on a passive peer-validated data store and/or database.

4 Claims, 7 Drawing Sheets

(58) Field of Classification Search
USPC .......................................................... 705/7.19
See application file for complete search history.

(56) References Cited

U.S. PATENT DOCUMENTS

| | | | | |
|---|---|---|---|---|
| 7,991,637 B1* | 8/2011 | Guiheneuf | ........... | G06Q 10/109 |
| | | | | 705/7.18 |
| 8,180,657 B2 | 5/2012 | O'Sullivan et al. | | |
| 8,671,009 B1* | 3/2014 | Coley | ................. | G06Q 10/109 |
| | | | | 705/7.13 |
| 8,880,419 B2 | 11/2014 | Chen et al. | | |
| 2007/0168243 A1 | 7/2007 | Chen et al. | | |
| 2007/0282656 A1 | 12/2007 | Battcher et al. | | |
| 2009/0164236 A1 | 6/2009 | Gounares et al. | | |
| 2011/0015959 A1 | 1/2011 | Darreff et al. | | |
| 2011/0029343 A1 | 2/2011 | Darreff et al. | | |
| 2011/0270640 A1 | 11/2011 | Young et al. | | |
| 2012/0053963 A1* | 3/2012 | Seymour | ................ | G06Q 50/24 |
| | | | | 705/3 |
| 2012/0215552 A1* | 8/2012 | Goldschmidt | ......... | G06Q 10/10 |
| | | | | 705/2 |
| 2014/0156597 A1* | 6/2014 | Hakami | .................. | G06F 16/27 |
| | | | | 707/634 |
| 2014/0207509 A1* | 7/2014 | Yu | ...................... | G06Q 10/1095 |
| | | | | 705/7.19 |
| 2015/0081370 A1* | 3/2015 | Lo | ........................... | G06Q 10/06 |
| | | | | 705/7.19 |
| 2015/0237071 A1* | 8/2015 | Maher | ..................... | H04W 4/70 |
| | | | | 726/1 |
| 2015/0242819 A1 | 8/2015 | Moses et al. | | |

OTHER PUBLICATIONS

Dirk Neumann, Christian Bodenstein, Omer F. Rana, Ruby Krishnaswamy STACEE: Enhancing Storage Clouds using Edge Devices ACE '11: Proceedings of the 1st ACM/IEEE workshop on Autonomic computing in economics •Jun. 2011 •pp. 19-26 •https://doi.org/10.1145/1998561.1998567 (Year: 2011).*

International Search Report and Written Opinion issued in PCT/US2016/043553, dated Oct. 6, 2016.

* cited by examiner

SYSTEM AND METHOD FOR SCHEDULING APPOINTMENTS

CROSS-REFERENCE TO RELATED APPLICATION(S)

This application claims priority to, and the benefit of, U.S. Provisional Application 62/196,126, filed Jul. 23, 2015 and U.S. Provisional Application 62/253,337, filed Nov. 10, 2015, for all subject matter common to all applications. The disclosures of said provisional applications are hereby incorporated by reference in their entirety.

FIELD OF THE INVENTION

The present invention relates to a system and method for scheduling, calendaring, notifying, and providing automated real-time updating of scheduled appointment times. In particular, the present invention relates to dynamically optimizing a number of appointments being scheduled within a range of time using a distributed computing system suitable for providing a self-service model for patient driven scheduling of appointments.

BACKGROUND

Generally, scheduling appointments for healthcare services, in particular, requires calling the appropriate office of the service provider to coordinate an appointment time. The call to the appropriate office requires negotiating dates in which the service provider's availability matches that of the healthcare consumer. Traditionally, the consumer must rely upon the dates and times provided by the service provider and the service provider's scheduling software for completing the scheduling event. Oftentimes the consumer is not supplied with the full schedule of availability of the service provider and frequently has to schedule far in advance to find open time slots. Moreover, these conventional methodologies are service-provider-centric and do not allow customization by the consumer.

Conventionally, manually scheduling methods and/or software scheduling systems divide each day into blocks that can be assigned to consumers, usually on a first come first serve basis. However, this methodology experiences some shortcomings. Most service providers will strive to book every slot on a given day to ensure maximum profitability, which can result in overbookings and/or significant wait times if the service provider gets delayed, if appointments go over the booking time, and/or if the service provider gets detained on another matter. Once a delay has started it has a chain reaction throughout the remaining schedule, causing delays for the consumers with upcoming appointments on the schedule without providing means to mitigate the initial or subsequent delays. Instead, each subsequent consumer in that work day schedule will be adversely affected by the delay. Additionally, traditional scheduling methodologies and systems do not take into account consumer cancellations, rescheduling, etc. Accordingly, existing systems and methodologies cannot optimize the schedule in the situations that a consumer cancels and/or reschedules their appointment, resulting in wasted time and lost revenue for the service provider. Additionally, high volume service providers have too many consumers on a daily basis to efficiently track and optimize the schedule through the use of human organizing activities alone. Overall, long wait times and difficultly scheduling appointments can lead to frustrated consumers and reduced throughput.

SUMMARY

There is a need for a dynamically optimizing scheduling system to maximize schedules for service providers in a manner that proactively re-arranges appointments when an update is introduced to secure the highest quantity of scheduled minutes in a defined work day, while simultaneously meeting the preferences of the consumers being scheduled. The present invention is directed toward further solutions to address this need, in addition to having other desirable characteristics. Specifically the claimed invention is directed to an edge-connected computing system and method for scheduling, calendaring, notifying, and providing automated real-time updating of scheduled appointment times in response to a manual update of a specific scheduled appointment. The system and method optimizes the number of appointments capable of being scheduled within a range of time in such a way that maximizes the quantity of scheduled minutes in a defined work day for the service provider. In particular, a plurality of edge-connected devices (e.g., smartphones, tablets, laptops, etc.) constituting an edge-connected schema for handling elastic scheduling tasks, serve in the capacity of updating a master calendar, realized in the form of a passive peer-validated data store (not merely a generic server). The edge-connected devices are responsible for initiating scheduling changes and/or accepting proposed appointment changes to be reflected in the master calendar schema tables of the passive peer-validated data store.

Additionally, the method and system can enable users of the overall application to benefit from just-in-time queries of the passive peer-validated data store. Such queries can inform either notifications or alerts to edge-connected devices for appointment holders themselves, administrators, medical office, and/or other users who have a need to know updates in scheduled appointment times and/or durations. The system has the intrinsic capability, as conferred by the rules of engagement, to allow for dynamic rescheduling/reprioritization and notification of the plurality of scheduled users based upon a previously established list of selection/prioritization preferred criteria and rules (which themselves reside on the software pre-coordinated on the edge-connected devices), thus realizing differentiated levels of timeliness to constitutive and differently classified subscriber populations. The overall purpose of this optimization process is to allow patients to directly control and direct their scheduling and similarly, the rescheduling of appointments, while at the same time reducing or eliminating gaps between individually scheduled slots, thus reducing the overall incidence of delays, as experienced by users of the scheduling system.

In accordance with an embodiment of the present invention, a scheduling optimization system is provided. The system includes a passive peer-validated data store and a central database operating in a passive mode, the passive peer-validated data store being a transactional listener and transactional processor that updates a centralized appointment schedule stored on the central database. The system also includes a plurality of distributed edge-connected devices operating an edge-connected schema that shifts responsibility for processing operational rules for updating the centralized appointment schedule to the plurality of edge-connected devices. The plurality of distributed edge-connected devices provide instructions to the passive peer-validated data store for executing the operational rules to update the centralized appointment schedule. In response to a modification of an appointment stored on the central database, the edge-connected devices proactively initiate a process to re-arrange appointments to optimize the number of appointments capable of being scheduled within a defined range of time in such a way that maximizes the quantity of scheduled minutes occurring in a defined work day.

In accordance with aspects of the present invention, the operational rules are resolved by a majority quorum protocol shared between the plurality of distributed edge-connected devices.

In accordance with aspects of the present invention, the plurality of distributed edge-connected devices query the passive peer-validated data store for available open appointment slots in the centralized appointment schedule.

In accordance with aspects of the present invention, the edge-connected schema provides a plurality of prioritization rules distributed to the plurality of edge-connected devices, independent of the need for central schema, enforce orchestration, facilitating a true distributed computational model in real-time, based on collective knowledge of the edge-connected schema.

In accordance with aspects of the present invention, the edge-connected devices extract confirmation or rejection to book one or more open appointment slots in the centralized appointment schedule from the plurality of distributed edge-connected devices.

In accordance with an embodiment of the present invention, a scheduling optimization system is provided. The system includes a passive peer-validated data store and a central database in operating a passive mode, the central database storing a central appointment master calendar. The system also includes an edge-connected schema defined by distributed devices present in applications executing on a plurality of edge-connected devices in a collective adjudicative role, such that the collective adjudicative role validates any posted scheduling requests via a majority quorum protocol to exclude requests that are not authorized or legitimate, and the collective adjudicative role peer-authorizes requests by new edge-connected devices to access an edge-connected network. The system further includes a distributed computation database where all edge-connected schema queries, insertions and updates are carried out via rules and actions initiated from the plurality of edge-connected devices, with the passive peer-validated data store remaining in the capacity of a transaction listener and transaction processor, with no operational rules being executed on the passive peer-validated data store. The system also includes an assemblage of scheduling rules that are distributed through the plurality of edge-connected devices, that enable an execution for query and update operations on the central appointment master calendar. The system further includes an assemblage of the distributed devices that interactively apply distributed scheduling rules to dynamically arrive upon an optimal scheduling solution for the central appointment master calendar, thereby maximizing any number of pre-defined overall schedule attributes; and an assemblage of edge-connected rules that allow for a continuously updating the central appointment master calendar on the central database.

In accordance with aspects of the present invention, the users are enabled by the system to select optimal available appointment times, in real-time, by virtue of an instantiation of complete scheduling rules set on a respective edge-connected device of the plurality of edge-connected devices. In accordance with aspects of the present invention, the plurality of edge-connected devices implement processes of maintaining a centrally-placed calendar, without requirement of central rules-based database services. In accordance with aspects of the present invention, a plurality of prioritization rules distributed to the plurality of edge-connected devices, independent of the need for central schema, enforce orchestration, facilitating a true distributed computational model in real-time, based on collective knowledge of the edge-connected schema.

In accordance with an embodiment of the present invention, a system for providing automated real-time optimization of appointments is provided. The system includes a distributed computing scheduling tool configured to maintain synchronization of a centralized appointment calendar with a plurality of edge-connected devices. The distributed computing scheduling tool includes a scheduling tool configured to aggregate and evaluate currently open appointment slots and previously scheduled appointments from a passive peer-validated data store. The distributed computing scheduling tool also includes an electronic communication tool configured to receive requests for open appointment slots and adjustments to scheduled appointment slots from the plurality of edge-connected devices and provide the open appointment slots to the plurality of edge-connected devices. The electronic communication tool is also configured to receive a selection, from each of the plurality of edge-connected devices, of an open appointment slot from the open appointment slots and one or more preferred availability appointment slots, wherein the one or more preferred availability appointment slots is not one of the open appointment slots at a time of selection and receive an adjustment, from at least one of the plurality of edge-connected devices, to a scheduled appointment slot relative to slots of the previously scheduled appointments, thereby creating an adjusted scheduled appointment slot. The passive peer-validated data store is configured to store the open appointment slots, the one or more preferred availability appointment slots, the scheduled appointment slots, and the adjusted scheduled appointment slot. The scheduling tool is configured to perform schedule optimization. The optimization includes scheduling an appointment for the received selection of the open appointment slot from the each of received selection and removing the received selected of the open appointment slot from the open appointment slots. The optimization also includes updating the passive peer-validated data store with the created adjusted scheduled appointment slot, from the at least one of the plurality of distributed consumer computing devices and determining one or more new open appointment slots based on the adjusted scheduled appointment slot and comparing each of the one or more preferred availability appointment slots, in the passive peer-validated data store, to the adjusted scheduled appointment slot. When the comparing indicates a match, contacting an edge-connected device associated with the one or more preferred availability appointment slots to rescheduling a previously scheduled appointment in the one or more new open appointment slots. The optimization further includes sending an appointment update to each of the plurality of edge-connected devices associated the rescheduled previously scheduled appointment and performing optimization based on the rescheduled previously scheduled appointment. The schedule optimization contacts the at least one of the plurality of edge-connected devices proposing the open appointment slots and slots of the previously scheduled appointments are adjusted to maximize a number of scheduled minutes over a predetermined time period. The system further includes a synchronization tool configured to synchronize all appointment slot changes during optimization with each of the plurality of edge-connected devices.

In accordance with aspects of the present invention, the created adjusted scheduled appointment slot comprises at least one of a cancelation, reschedule, and delay of scheduled appointment.

In accordance with an embodiment of the present invention, a system for providing automated real-time optimization of appointments is provided. The system includes an electronic communication tool configured to receive requests for open appointment slots from a plurality edge-connected devices. The system also includes a scheduling tool configured to aggregate the open appointment slots from a passive peer-validated data store. The electronic communication tool is configured to provide the open appointment slots to the plurality edge-connected devices. The electronic communication tool is also configured to receive a selection of an open appointment slot, from at least one user of the plurality edge-connected devices, from the open appointment slots and one or more preferred availability appointment slots, wherein the one or more preferred availability appointment slots is not currently one of the open appointment slots at the time of selection. The scheduling tool is configured to schedule an appointment for the at least one user in the selected open appointment slot and remove the selected open appointment slot from the open appointment slots. The data store is configured to store the one or more preferred availability appointment slots. The electronic communication tool is configured to receive indication of a cancelation for a previously scheduled appointment slot. The scheduling tool is also configured to perform schedule optimization. The optimization including comparing each of the one or more preferred availability appointment slots in the passive peer-validated data store, received from the plurality edge-connected devices, to the previously scheduled appointment slot. When the comparison indicates a match, send a notification to confirm rescheduling the appointment to a rescheduled appointment for the at least one user associated with the one or more preferred availability appointment slots in the previously scheduled appointment slot and send an appointment update to each of the plurality edge-connected devices associated with the at least one user reflecting the rescheduled appointment upon acceptance by the at least one user. When the comparison does not indicate a match, or at the at least one user rejects the notification, adding the previously scheduled appointment slot to the open appointment slots and continue the optimization.

In accordance with aspects of the present invention, a re-prioritization is performed when any consumer no shows, cancels, arrives late, or reschedules.

In accordance with an embodiment of the present invention, a method for providing proactive automated real-time reprioritizing of appointment slots over a plurality of consumer edge-connected devices is provided. The method includes requesting open appointment slots, from a passive peer-validated data store, for a service provider and receiving, from the passive peer-validated data store, and displaying the open appointment slots on a consumer computing device of the plurality of consumer edge-connected devices. The method also includes receiving, from a user, a selection of at least one open appointment slot of the open appointment slots and receiving, from the user, at least one preferred availability appointment slot, wherein the at least one preferred availability appointment slot is not currently one of the open appointment slots at the time of selection. The method further includes transmitting the selected at least one open appointment slot and the at least one preferred availability appointment slot to the passive peer-validated data store and extracting, from the passive peer-validated data store, an alert for a newly available appointment slot matching the at least one preferred availability appointment slot. The method also includes transmitting acceptance or rejection of the newly available appointment slot to the passive peer-validated data store and extracting, from the passive peer-validated data store, a confirmation of an appointment for the user based on the selected at least one open appointment slot and the at least one preferred availability appointment slot.

In accordance with aspects of the present invention, the method further includes providing dynamic rescheduling of primary and ancillary study appointments based on geospatial location of user location and service provider location, wherein the dynamic rescheduling occurs as a real-time reiterative process executed by the plurality of consumer edge-connected devices.

In accordance with aspects of the present invention, the method further includes providing geospatially-coupled electronic incentive coupons to the user. In accordance with aspects of the present invention, the incentive coupons are provided in response to a service-provider associated delay event.

In accordance with aspects of the present invention, the method further includes analyzing a stated reason of visit of the user for the appointment and categorizing the stated reason of visit for the user according to pre-established classes of reasons. The categorizing within the pre-established classes of reasons initiates at least one of a computationally facilitated telephone contact of the user by the service provider and an automated dispatch of emergency medical services to a geospatial location of the user.

In accordance with aspects of the present invention, the method further includes dynamically modeling prior visit durations of one or more users for stated reasons to assist with a time block requirement for scheduled future appointments.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
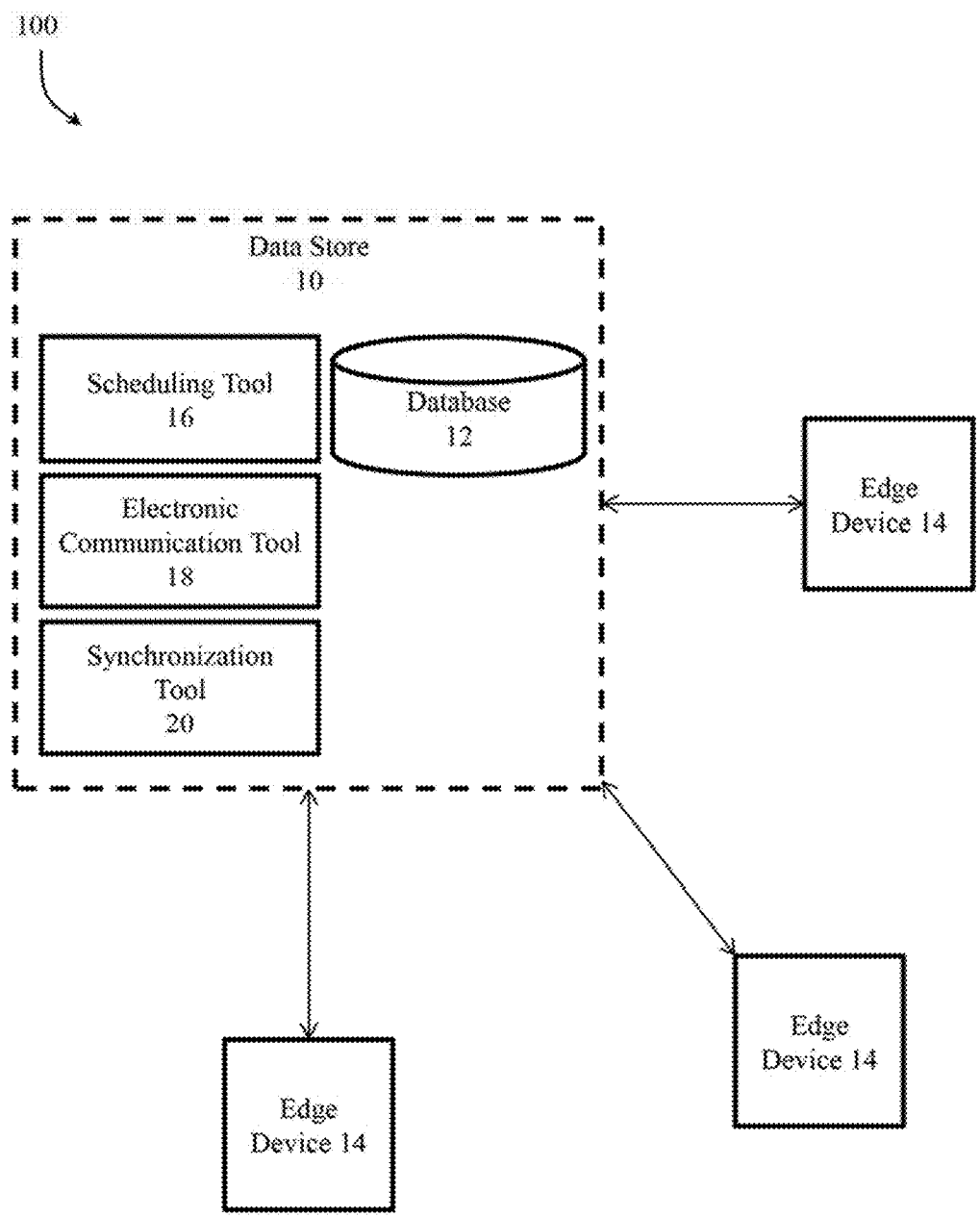
FIG. 1 is an illustrative environment for implementing the steps in accordance with the aspects of the invention.

An illustrative embodiment of the present invention relates to a centralized master calendar that proactively re-arranges appointments based on identifying an optimal combination of appointments, resulting in a maximum number of scheduled minutes for appointments within a given time frame (e.g., a 9 AM to 5 PM work day), and in accordance with preselected preferences of the patients being scheduled. The calendar is centrally placed in a passive peer-validated, data store and is updated and optimized as needed by a plurality of user operable edge-connected devices (e.g., smartphones, desktops, laptops, etc.) that operate collectively as a crowd-sourced validation layer. The resulting assemblage shifts the data adjudication roles and business rules for the scheduling of appointments validation steps that are traditionally carried out by a centralized server, to instead upon the plurality of edge-connected devices operating autonomously. It should be emphasized that this is an unconventional and novel system configuration. This shift of control converts users' devices from having a passive role in scheduling appointments (as would be encountered in a traditional client-server implementation approach) to having an active role where both client identity and business rules are validated collectively at a peer-to-peer crowd-sourced level. Said differently, the present invention alters the conventional technological approach for scheduling by making use of a distributed computation model, where there is a peripherally-shifted command and control rules layer arranged in a novel and unique configuration to realize a more direct process for calendar updating as applied to the maintenance of an overall calendar schema. Leveraging this new technology, user-initiated requests (e.g., scheduling actions carried out by patients, administrators, doctors, etc.) on mobile phones, tablets, or other edge-connected devices directly affect updates to schedules stored on a passive peer-validated data store.

Additionally, the present invention enables patients to make new appointments by referencing the passive peer-validated data store housing the calendar, to view and receive updates for upcoming appointments, as well as newly available appointment slots providing patients access to the calendar, thus enabling additional functionality not available to patients in conventional scheduling systems. Specifically, the patient (i.e., healthcare consumer) can: 1) observe when appointments are behind schedule, in real-time; 2) can notify the office that they are running late and consequently that their appointment slot may be available to others; 3) notify the office that they would like to cancel an appointment; and 4) notify the office that they would like to reschedule their appoint and thus free up their appointment slot. In short, any time that a patient changes or cancels their appointment slot, the edge-controlled system optimizes the overall schedule to enable all users to efficiently interact with and benefit from the scheduling capabilities and features of the present invention.

Additionally, the edge-controlled system optimizes the schedule by proactively attempting to move appointments adjacent to an updated appointment slot to maximize the number of scheduled minutes in a work day, and therefore minimize the number of unscheduled minutes (or gaps between appointments) each day. As would be appreciated by one skilled in the art, after each appointment change is transmitted to the passive peer-validated data store, the schedule is updated to reflect the changes and initiates optimization of the schedule to fill in vacant appointment slots by communicating with the edge-connected devices. The optimization can include the passive peer-validated data store notifying system users on their edge-connected devices that an appointment slot is available, and subsequently requesting confirmation as to whether the user of the edge-connected devices would like to book one of the available appointment slots, or alternatively to querying users with existing scheduled slots as to their willingness to move their time slightly sooner or later to accommodate the newly sought optimization.

The system and method of the present invention relate to a specific, discrete, implementation of optimization of appointment scheduling to maximize the number of minutes in a defined day that are scheduled versus being left open without an appointment in such a way that also factors in preferences of parties to the scheduled appointments. The present invention provides a technological and operational improvement in the system and processes taught herein that result in the stated improved optimization and utilization of scheduled minutes in a calendar. The inventive system and method introduce a technology-based solution leveraging the unconventional reliance upon edge-connected devices for processing power and the unconventional and automated schema for proactively reorganizing scheduled appointments in a calendar to optimize scheduled minutes in a calendar in such a way that overcomes existing problems with conventional systems for maintaining scheduled appointments in a calendar.

In accordance with an example embodiment, if a previously indicated preferred appointment slot becomes available, a user edge-connected device initiates an edge-connected and peer-validated scheduling update to a central calendar, ultimately leading to an update request forwarded to the passive peer-validated data store and the confirmed scheduling of the preferred appointment slot. Similarly, the edge connected devices can continuously query the passive peer-validated data store for new openings and gaps between appointments and initiate multiple classes and types of overall schedule optimization processes (to be carried out by edge-controlled devices) leading to optimization of the schedule by filling in existing appointment gaps or by moving and re-scheduling appointments adjacent to the gaps to create different sized (and potentially fewer) gaps that better fit with the current portfolio of desired appointment durations.

For example, individual edge-connected devices can query the central passive peer-validated data store in order to determine if any given user should be proactively notified proactively notified, with preferred timeslots that match currently available scheduling gaps or similarly may notify users with adjacent time slots that are similarly available. As each appointment slot is shifted, opened, or reserved by the edge-connected devices, the master schedule/calendar is updated in the passive peer-validated data store by rigorous peer-managed & crowd-sourced distributed computing algorithms that include multiple levels of both edge-connected node authentication and rules validation. In the setting that all qualifying rules conditions are reached, the final contributing edge-connected device then initiates a transaction upon the passive peer-validated data store to log the existence of the new scheduled event, thus filling the open time slot. Similarly, via periodically and predetermined queries, all of the edge-connected devices may query the passive peer-validated data store to learn of any new gaps or openings in the overall calendar (with this updated information being of utility to patients and administrative users alike). The new gaps can include any modification and/or any adjustments made to the schedule appointment slots. For example, the adjustments to the scheduled appointment slots can include insertions, cancelations, rescheduling, delays related to the scheduled appointment (e.g., provider delay or customer delay), etc. In response to instructions to optimize for the gap, the passive peer-validated data store can contact patients on their edge-connected devices to request an appointment change to fill the gap. Accordingly, the passive peer-validated data store can identify gaps in a schedule, initiate queries for appointments to edge-connected devices, and finally receive scheduled appoints from the edge-connected devices, etc. Similarly, the edge-connected devices can initiate the identification of the gaps based on information extracted from the passive peer-validated data store.

The present invention relates to a system and method for scheduling, calendaring, notifying, and providing automated real-time updating of scheduled appointment times. In particular, the present invention relates to dynamically optimizing a number of appointments being scheduled within a range of time (e.g., a work day) using a distributed computing system, based on edge-connected devices, suitable for providing a self-service model for scheduling appointments.

FIGS. 1 through 5, wherein like parts are designated by like reference numerals throughout, illustrate an example embodiment or embodiments of scheduling, calendaring, notifying, and providing automated real-time updating of scheduled appointment times, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed in a manner still in keeping with the spirit and scope of the present invention.

In accordance with an example embodiment of the present invention, FIG. 1 depicts a distributed-computation patient scheduling solution or a scheduling optimization system 100. The scheduling optimization system 100 includes a passive peer-validated data store 10, operating in passive mode, a database 12 configured to store a calendar/appointment schedule, and a plurality of edge-connected device(s) 14 (or nodes) that in combination, form the basis of an edge-connected schema. In particular, FIG. 1 depicts the fundamentally different approach intrinsic to an edge-connected topology. Specifically, the rules-based and transactional aspects intrinsic to traditional client-server implementations are replaced in the system 100 of the present invention by the use of a distributed model (e.g., edge-based schema). In particular, tasks of: 1) business rule adjudication and 2) schema updating are exclusively carried out by edge-connected devices 14 (and not by a conventional centrally situated database server). The central, passively-updated data store 10 is specifically configured to accept peer-consensus and validated transactions and updates from bona fide edge-connected devices 14, such that no server-based or server-initiated rules are required in this operational model. Consequently, the centrally placed resource is more appropriately referred to as a data store (e.g., data store 10) and not a server.

As would be appreciated by one skilled in the art, the passive peer-validated data store 10, the database 12, and the edge-connected device(s) 14 can include any combination of computing devices known in the art, each including a single computing device, a collection of computing devices in a network computing system, a cloud computing infrastructure, or a combination thereof. For example, the passive peer-validated data store 10 and the plurality of edge-connected device(s) 14 can include personal computers, laptops, tablets, smartphones, etc. Similarly, as would be appreciated by one of skill in the art, the database 12 can include any combination of computing devices configured to store and organize a collection of data or can be part of the passive peer-validated data store 10 computing device. For example, database 12 can be a local storage device on the passive peer-validated data store 10, a remote database facility, or a cloud computing storage environment. The database 12 can also include a database management system utilizing a given database model configured to interact with a user for analyzing the database data.

In accordance with an example embodiment of the present invention, the passive peer-validated data store 10, the database 12, and the edge-connected device(s) 14 can be configured to establish a connection and communicate over telecommunication network(s) to carry out aspects of the present invention. As would be appreciated by one skilled in the art, the telecommunication network(s) can include any combination of known networks. For example, the telecommunication network(s) may be combination of a mobile network, WAN, LAN, or other type of network. The telecommunication network(s) can be used to exchange data between the passive peer-validated data store 10 and the edge-connected device(s) 14, exchange data with the database 12, and/or to collect data from additional sources.

In accordance with an example embodiment of the present invention, operating in passive mode, the passive peer-validated data store 10 is configured to be limited to a transactional listener and transactional processor. Distributed clients, present in the form of an application executing on each of the edge-connected device(s) 14, are configured to handle processing the operational rules in place of the passive peer-validated data store 10. An edge-connected schema is created by the plurality of distributed edge-connected device(s) 14 and is organized in accordance with conventional graph theory. As would be appreciated by one skilled in the art, graph theory can be used to structure the edge-connected device(s) 14 in a representative network or any alternative known methodology known in the art can be used without departing from the functionality of the present invention.

In accordance with an example embodiment of the present invention, the edge-connected schema includes a distributed computing scheduling tool 16 configured to maintain synchronization of the centralized appointment calendar with the plurality of edge-connected devices 14. The distributed computing scheduling tool 16 includes a scheduling tool 16 configured to at any given time aggregate and evaluate currently open appointment slots and previously scheduled appointments from the passive peer-validated data store 10. The edge-connected schema also includes an electronic communication tool 18 configured to receive requests for open appointment slots and adjustments to scheduled appointment slots from the plurality of edge-connected devices 14, provide the open appointment slots to the plurality of edge-connected devices 14, receive a selection, from each of the plurality of edge-connected devices 14, of an open appointment slot from the open appointment slots and one or more preferred availability appointment slots, wherein the one or more preferred availability appointment slots is not one of the open appointment slots at a time of selection, and receive an adjustment, from at least one of the plurality of edge-connected devices 14, to a scheduled appointment slot relative to slots of the previously scheduled appointments, thereby creating an adjusted scheduled appointment slot.

In accordance with an example embodiment of the present invention, the scheduling tool 16 is configured to perform schedule optimization. The optimization includes scheduling a new appointment for a received selection of an appointment slot from a list of available open appointment slots obtained from the passive peer-validated data store 10, wherein the received selection of appointment slot comes from at least one of the plurality of distributed consumer computing devices. The master schedule on the passive peer-validated data store 10 is updated accordingly, including removing the selected appointment slot from the list of open appointment slots and inserting the newly created adjusted scheduled appointment slot for the received appointment selection. The optimization further includes determining one or more new open appointment slots based on the adjusted scheduled appointment slot and comparing each of the one or more preferred availability appointment slots, in the passive peer-validated data store 10, to the adjusted scheduled appointment slot. When the comparing indicates a match, contacting an edge-connected device associated with the one or more preferred availability appointment slots to rescheduling a previously scheduled appointment in the one or more new open appointment slots. The optimization includes sending an appointment update to each of the plurality of edge-connected devices 14 associated with the rescheduled previously scheduled appointment and performing optimization based on the rescheduled previously scheduled appointment. In particular, the schedule optimization contacts the at least one of the plurality of edge-connected devices 14 proposing the open appointment slots and slots of the previously scheduled appointments are adjusted to maximize a number of scheduled minutes over a predetermined time period. The edge-connected schema also includes a synchronization tool 20 configured to synchronize all appointment slot changes during optimization with each of the plurality of edge-connected devices 14. As would be appreciated by one skilled in the art, the scheduling tool 16, the electronic communication tool 18, and the synchronization tool 20 can include any combination of hardware and software configured to carry out the aspects of the present invention. Additionally, the scheduling tool 16, the electronic communication tool 18, and the synchronization tool 20 can be implemented on the passive peer-validated data store 10, the edge-connected device(s) 14, or a combination thereof.

In accordance with an example embodiment of the present invention, the passive peer-validated data store 10 is configured to only retrieve and/or store data and transactional records, as calculated and validated by the plurality of edge-connected device(s) 14. The edge-connected device(s) 14 perform computational tasks, execution of instructions from managing/updating the calendar, and/or referential enforcement of operational rules (e.g., scheduling updates). Additionally, the edge-connected device(s) 14 can provide instructions to the passive peer-validated data store 10 for execution. As would be appreciated by one skilled in the art, the operational rules can include more complicated computations than read and write commands. For example, the edge-connected device(s) 14 can perform computations related to operational rules such as receiving a new appointment request, finding an optimal fit within an existing appointment schedule stored on the passive peer-validated data store 10, and issuing a notification to a user that the requested appointment time is available or unavailable. When a requested appointment time is determined to be unavailable, the distributed devices can perform additional operational computations to find a similar appointment time(s) (e.g., based on user preference or proximate times) and suggest the appointment time to the user.

In accordance with an example embodiment, the passive peer-validated data store 10 provides no rules of its own, but rather, relies upon the rules as held and maintained in the plurality of edge-connected device(s) 14, as presented in TABLE 1.

TABLE 1 physician 1
appt(length=30,time="8:30",cancel_chance="95",average_length=25),
appt(length=30,time="8:30",cancel_chance="95",average_length=25),
appt(length=30,time="8:30",cancel_chance="95",average_length=25)
physician 2
appt(length=30,time="9:00",cancel_chance="95",average_length=25),
appt( ),
appt(length=30,time="9:00",cancel_chance="95",average_length=25)
physician 3
appt(length=30,time="10:30",cancel_chance="95",average_length=25),
appt(length=30,time="10:30",cancel_chance="95",average_length=25),
appt(length=30,time="10:30",cancel_chance="95",average_length=25)

In accordance with an example embodiment of the present invention, the passive peer-validated data store 10 provides the business rules and appointment calendar to the edge-connected device(s) 14 by allowing access by the edge-connected device(s) 14 to the appropriate data or files stored on the passive peer-validated data store 10 (e.g., a centralized master calendar). Providing access to the basic business rules and the appointment calendar enables the edge-connected device(s) 14 to find and insert requested appointment(s) into the master calendar. For example, utilizing the provided access to the data on the passive peer-validated data store 10 and/or the database 12, the edge-connected device(s) 14 can run a command of: "appt (length=45,time=">9:00",cancel_chance="95", average_length=60)" to find and insert a requested appointment with the best fit and update the appointment into the appointment schedule residing on the passive peer-validated data store 10. As would be appreciated by one skilled in the art, the passive peer-validated data store 10 can also be configured to receive requests for particular sets of data (e.g., business rules or appointment schedules) and provide the requested sets of data to the edge-connected device(s) 14 for processing.

The edge-connected device(s) 14 can utilize the provided requested sets of data to provide instructions for modifying the calendar back to the passive peer-validated data store 10. In particular, once the edge-connected device(s) 14 finish processing data obtained from the calendar, instructions are transmitted to the passive peer-validated data store 10 for updating data and store the new data within the calendar and the passive peer-validated data store 10 records the instructions associated with those messages. For example, the edge-connected device(s) 14 can provide instructions to update the appointment schedule with a new appointment and the passive peer-validated data store 10 can store the new appointment provided by the edge-connected device(s) 14 in the appointment schedule stored on the passive peer-validated data store 10 or database 12. As a result, the passive peer-validated data store 10 acts as a passive transactional listener and transactional processor without the need for pre-execution of any of the associated operational rules (e.g., schedule modification) within the system of the present invention.

In accordance with an example embodiment of the present invention, the passive peer-validated data store 10 includes an electronic communication tool 18 configured to receive requests for open appointment slots from a plurality of edge-connected devices 14. The electronic communication tool 18 is also configured to provide the open appointment slots to the plurality of edge-connected devices 14. The electronic communication tool 18 is further configured to receive a selection of an open appointment slot, from at least one user of the plurality of consumer devices, from the open appointment slots and one or more preferred availability appointment slots, wherein the one or more preferred availability appointment slots is not currently one of the open appointment slots at the time of selection. The passive peer-validated data store 10 also includes a scheduling tool 16 configured to aggregate the open appointment slots from the passive peer-validated data store 10. The scheduling tool 16 is also configured to schedule an appointment for the at least one user in the selected open appointment slot and remove the selected open appointment slot from the open appointment slots. The passive peer-validated data store 10 is configured to store the one or more preferred availability appointment slots. The electronic communication tool 18 is also configured to receive indication of a cancelation for a previously scheduled appointment slot and the scheduling tool 16 is configured to perform schedule optimization. In accordance with an example embodiment of the present invention, the optimization includes comparing each of the one or more preferred availability appointment slots in the passive peer-validated data store 10, received from the plurality of edge-connected devices 14, to the previously scheduled appointment slot. When the comparison indicates a match, a notification is sent to confirm rescheduling the appointment to a rescheduled appointment for the at least one user associated with the one or more preferred availability appointment slots in the previously scheduled appointment slot and an appointment update is sent to each of the plurality of edge-connected devices 14 associated with the at least one user reflecting the rescheduled appointment upon acceptance by the at least one user. When the comparison does not indicate a match, or the at least one user rejects the notification, adding the previously scheduled appointment slot to the open appointment slots and continue the optimization. A re-prioritization is performed when any consumer no shows, cancels, arrives late, or reschedules.

In accordance with an example embodiment of the present invention, the edge-connected device(s) 14, run applications as distributed devices to create a distributed computation system and utilize rules and actions to handle all schema queries, insertions, and updates as they relate to the scheduling optimization process for the central schedule stored by the passive peer-validated data store 10. For example, the plurality of edge-connected device(s) 14 can perform algorithmic scheduling and initiate updates to the data stored on the passive peer-validated data store 10. With the plurality of the edge-connected device(s) 14 operating as the initiator in the distributed-computation patient scheduling solution, the passive peer-validated data store 10 is delegated to the capacity of a transaction listener. As would be appreciated by one skilled in the art, the distributed devices/plurality of edge-connected device(s) 14 can include any client devices that are capable of performing the computational tasks using the data stored on the passive peer-validated data store 10. Users of the edge-connected devices 14 can include patients, doctors, and administrators at a clinic/doctor's office.

In accordance with an example embodiment of the present invention, the distributed-computation scheduling optimization system 100 includes an assemblage of scheduling rules that are distributed through all of the edge-connected device(s) 14. The scheduling rules allow the edge-connected device(s) 14 to execute commands for querying, inserting and updating operations to a master appointment calendar stored on the passive peer-validated data store 10. The scheduling rules enable the edge-connected device(s) 14 to query the passive peer-validated data store 10 for available appointment slots, insert/reserve an appointment in an available appointment slot, and/or update a status of a patient based on their availability for a given appointment. The scheduling rules can also include rules that are directed to medically relevance, patient preference, and/or medical practice relevance. For example, the rules may dictate that a user cannot book at a particular medical practice appointment between 12 and 2 because of meetings, or that the patient cannot book two particular appointments at a particular date because of a medically related conflict or requirement (e.g., cannot schedule a procedure that requires fasting on the same day as a procedure that requires drinking fluids).

The scheduling optimization system 100 can also include an assemblage enabling the edge-connected device(s) 14 to interactively apply distributed scheduling rules to dynamically arrive upon an optimal scheduling solution, thereby maximizing any number of pre-defined overall schedule attributes. The scheduling optimization system 100 can further include an assemblage of edge-connected device(s) 14 connected rules that allow for a continuously updated central master appointment calendar (e.g., stored on the passive peer-validated data store 10). In accordance with an example embodiment, the scheduling optimization system 100 enables patients to use their edge-connected device(s) 14 to select optimal available appointment times, in real-time, by virtue of the instantiation of the complete scheduling rules set on their edge-connected device(s) 14 (e.g., smartphone). As would be appreciated by one skilled in the art, the scheduling rules can be stored, maintained, and provided to the edge-connected device(s) 14 via connection and updates to the passive peer-validated data store 10.

In accordance with an example embodiment of the present invention, the plurality of edge-connected device(s) 14 can be configured to accomplish the tasks of maintaining the centrally-placed calendar, without the need for a conventional centrally placed and rules-based database. In particular, the scheduling optimization system 100 effectively enforces a plurality of prioritization rules as directly implemented on the plurality of edge-connected device(s) 14 independently of the need for a central schema orchestration (e.g., having rules co-resident on the passive peer-validated data store 10), facilitating a true distributed computational model in real-time, based on collective knowledge of the edge-connected schema. For example, a user of an edge-connected device 14 can view the latest master schedule on the passive peer-validated data store 10 and directly book any available appointment slot in the schedule, resulting in the master schedule being updated with the new appointment. In this example, the passive peer-validated data store 10 is a passive repository and merely updates the master calendar according to the instructions received from the edge-connected device(s) 14.

Figure 2:
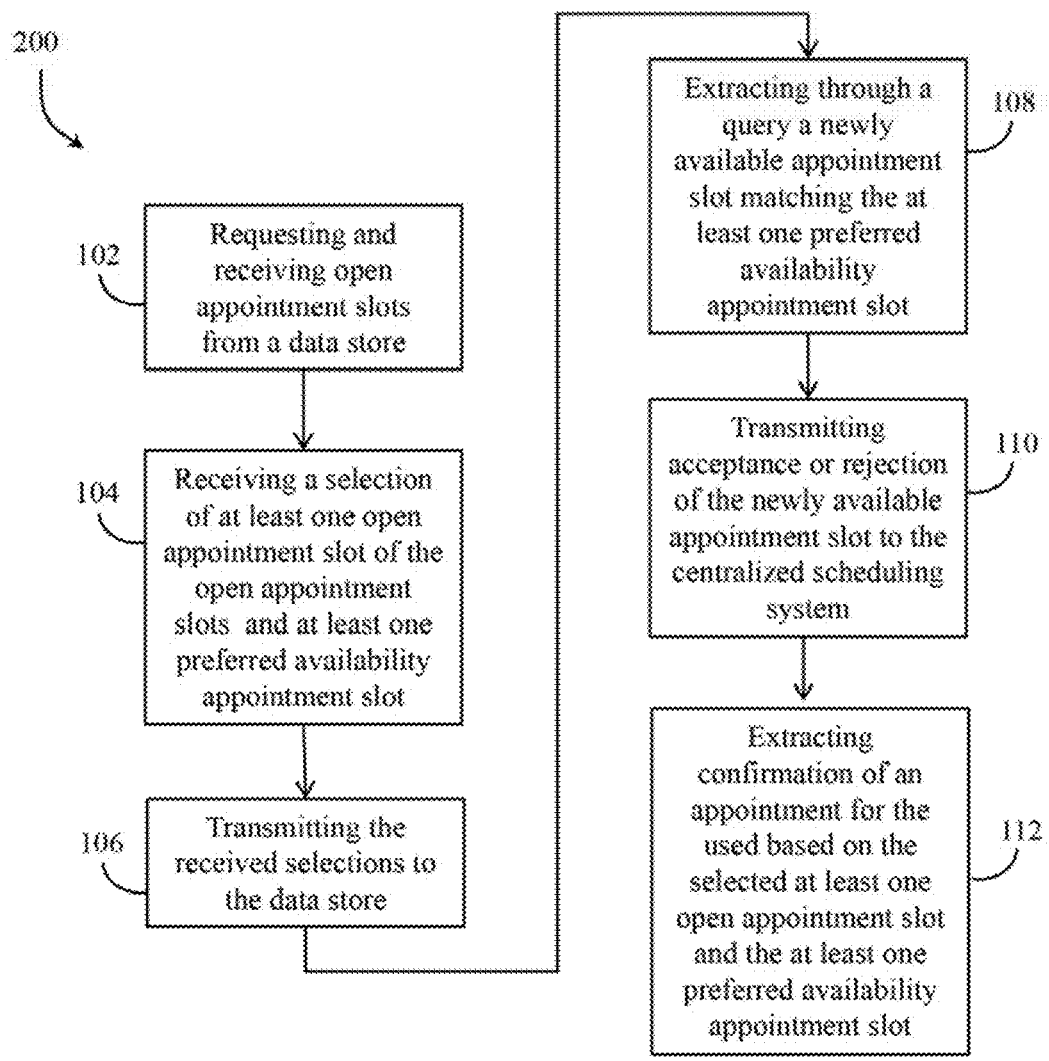
FIG. 2 is an illustrative flowchart depicting the operation of the consumer driven schedule optimization system, in accordance with aspects of the invention.

In operation, as depicted in FIG. 2, the scheduling optimization system 100 provides automated real-time optimization of appointments based on patient driven scheduling preferences. Initially, the edge-connected device(s) 14 request open appointment slots, from a centralized scheduling system operating on the passive peer-validated data store 10. For example, from an edge-connected device 14, a patient can request to see available appointments on the upcoming Friday. The edge-connected device 14 receives/obtains appointment slots/scheduling data, from the centralized scheduling tables that are co-located on the passive peer-validated data store 10, and displays the open appointment slots for the upcoming Friday (step 102). As would be appreciated by one skilled in the art, the request and reception of the open appointment slots can be requested and obtained utilizing any methodology known in the art.

The edge-connected device 14 receives, from the patient, a selection of at least one open appointment slot of the received open appointment slots. Additionally, if the patient is flexible, the patient can indicate a level of flexibility along with preferred times for their availability and will be notified when appointment times match that availability. The edge-connected device 14 receives, from the patient, at least one preferred availability appointment slot, wherein the at least one preferred availability appointment slot is not currently one of the open appointment slots at the time of selection (step 104). The edge-connected device 14 transmits the selected at least one open appointment slot and/or the at least one preferred availability appointment slot to the passive peer-validated data store 10 (step 106). In particular, the preferred availability appointment slot can be submitted to the passive peer-validated data store 10 for storage, and the passive peer-validated data store 10 can periodically check to see if any stored preferred availability appointment slot times match open appointment slots. When a match is found, the edge-connected devices 14 can contact the passive peer-validated data store 10 and log the request for the available appointment slot(s).

The one or more edge-connected devices 14 extract, through a periodic scheduled query mechanism (pull data model) of the passive peer-validated data store 10, conditions constituting an alert for a newly available appointment slot that matches the at least one preferred availability appointment slot (step 108). One or more edge-connected devices 14 transmit acceptance or rejection of the newly available appointment slot to the passive peer-validated data store 10 (step 110). As would be appreciated by one skilled in the art, this could be performed automatically by the assemblage of edge-connected device(s) 14 acting upon the passive peer-validated data store 10. In accordance with an illustrative example of the present invention, the one or more edge-connected device(s) 14, through continuous data polling, can become aware of the open appointment slot one at a time based on priority to reduce multiple acceptances of the appointment slot. The one or more edge-connected devices 14 extract, from the passive peer-validated data store 10 a confirmation of an appointment for a patient based on the selected at least one open appointment slot on one of the edge-connected devices 14 and the at least one preferred availability appointment slot (step 112). The confirmation happens automatically by default, however, the passive peer-validated data store 10 can instruct a user to manually accept or decline appointment requests even if the requests are curated by the system 100. As would be appreciated by one skilled in the art, the edge-connected device(s) 14 can carry out queries on the passive peer-validated data store 10 and repeat the above-mentioned steps for each time an appointment is made and/or changed, based on the received selections from the edge-connected devices 14.

In accordance with an illustrative example of the present invention, changes made by one or more edge-connected device(s) 14 can cause the passive peer-validated data store 10 to accept schedule optimization updates from one or more said edge-connected device(s) 14. For example, if a patient cancels their appointment, instructions for the cancelation of the appointment are transmitted to the passive peer-validated data store 10 via the patient's edge-connected device 14. Similarly, a user can insert an appointment in an empty slot and transmit the insertion to the passive peer-validated data store 10 via the patient's edge-connected device 14. In response to receiving the canceled or inserted appointment instruction, the passive peer-validated data store 10 can update the core schema to reflect the request associated with the cancelation or insertion. In accordance with an example embodiment of the present invention, the optimization procedure can include the steps 108-112 as discussed with respect to FIG. 2. As would be appreciated by one skilled in the art, the optimization can be performed automatically by the passive peer-validated data store 10 or the passive peer-validated data store 10 can prompt an administrative device (such as an administrator's computer) requesting if they would like to optimize the schedule. During optimization procedure, edge-connected device(s) 14 are notified, by the passive peer-validated data store 10 that an open appointment slot is available and request confirmation or rejection to book or move their appointment to the open appointment slot.

In accordance with an example embodiment of the present invention, the optimization can start with notifying edge-connected device(s) 14 of patients (e.g., identified in the system as flexible patients) with adjacent appointment times of the open appointment requesting confirmation to change their appointment. Similarly, the passive peer-validated data store 10 can notify edge-connected device(s) 14 based on other factors, such as a patient has an appointment for the same time period as the available appointment but on the following day. If the notified patient accepts the new appointment slot, then the appointment slot vacated by the patient can be offered to the patient associated with the next adjacent appointment slot and this process can continue until a quorum is satisfied. The quorum being determined by the number of appointment holders that must commit to moving their appointment to make the combination of changed appointments fit onto the calendar in the revised arrangement. In accordance with an example embodiment, the quorum is handled by the edge-connected devices 14 acting in a collective adjudicative role and not the passive peer-validated data store 10. Accordingly, patients are contacted with the proposed appointment change and the passive peer-validated data store 10 seeks confirmation of the proposed change. The passive peer-validated data store 10 will continue contacting edge-connected device(s) 14 until the quorum is satisfied (e.g., all desired open appointment slots are filled). For example, if there is only one available appointment slot available then the quorum is one but if there are three appointment slots available (e.g., due to cancellations and/or adjacent appointment slots shifting) then the quorum is three. Once the quorum is met, the final appointment changes are made at the centrally managed master schedule stored on the passive peer-validated data store 10 and the remaining plurality of edge-connected device(s) 14 can become aware of the update upon their next regularly scheduled polling.

In accordance with an example embodiment of the present invention, the edge-connected device(s) 14 can be programed and allocated in a collective adjudicative role. The collective adjudicative role of the edge-connected device(s) 14 can be used to validate any scheduling requests and/or changes. The scheduling requests and or changes can be validated as dictated by a majority quorum protocol. For example, the majority quorum protocol can be utilized to authorize legitimate scheduling requests and/or changes and exclude unauthorized or illegitimate scheduling requests and/or changes. In terms of validating the scheduling requests and/or changes, sequentially, each device of the edge-connected device(s) 14 is provided the same scheduling info (e.g., request, current vacancies, predicted likelihood of future vacancies, etc.) from the passive peer-validated data store 10. Once an edge-connected device 14 has computed the most efficient schedule, it passes the information along with a unique hash (tied to the device) to the next edge-connected device 14 in the sequence of edge-connected device(s) 14 to perform the same computation process and confirm the schedule's efficiency. Once a threshold number of edge-connected devices 14 have confirmed the schedule, the next edge-connected device 14 in the sequence will then submit the updated schedule to the passive peer-validated data store 10, along with all the hashes to store what devices performed what task. As would be appreciated by one skilled in the art, the threshold number can be a user provided values (e.g., administrative user) or a system default value. Similarly, the majority quorum protocol can be utilized to control and regulate other aspects of the edge-connected network. For example, the majority quorum protocol can be utilized for peer-authorization of requesting new edge-connected device(s) 14 to access an edge-connected network and the information stored thereon.

In accordance with an example embodiment of the present invention, the scheduling optimization system 100 can also include an assemblage enabling the edge-connected device (s) 14 to automatically perform scheduling, scheduling optimization, and other services utilizing a combination of available information. In particular, the scheduling optimization system 100 can utilize geospatial location information of the edge-connected device(s) 14, historical appointment information, and/or promotional incentives when optimizing scheduling. For example, the scheduling optimization system 100 can provide dynamic rescheduling of primary and ancillary study appointments, based on geospatial location of both consumer (e.g., patients) and service provider locations, such that time and distance factors can be minimized. Additionally, the prioritization of rescheduling appointments can be modified based on the distance between a consumer and a service provider and/or the time/duration of the appointment. For example, a consumer traveling a short distance can be contacted regarding possibly rescheduling prior to contacting a consumer traveling from a longer distance about rescheduling because it may be easier for consumers located within a close proximity to the service provider to reschedule their appointment time.

Similarly, if an open appointment slot becomes available on short notice, then the consumers with geolocations closest to the service provider can be offered the open appointment slot before consumers that have a longer distance to travel, making it more difficult to alter their day and arrive on time for a short notice appointment. As would be appreciated by one skilled in the art, any preferences with respect to distance can be user provided values (e.g., administrative user) or a system default value. Additionally, other preferences besides distance to a provider can be prioritized. For example, appointment optimization can prioritize customers (patients) based on age, handicaps, severity of medical status, etc. This process can occur as a real-time reiterative process taking place iteratively on collective edge-connected computation devices across the grid until the quorum is met (e.g., the targeted open appoint slot(s) are filled). As would be appreciated by one skilled in the art, the rules for prioritizing can be predetermined and initiated automatically by the scheduling optimization system 100.

In accordance with an example embodiment of the present invention, the scheduling optimization system 100 can provide geospatially-coupled electronic incentive coupons to customers based on pre-established scheduling business rules stored on the passive peer-validated data store 10. The transmission of the coupons can be initiated by the passive peer-validated data store 10 or by the edge-connected device (s) 14. An example of scheduling business rules can include awarding a coupon to a consumer who was subject to a service-provider associated delay and/or rescheduling or providing an incentive coupon for attracting consumers to a particular service-provider and/or appointment time slot. In accordance with an example embodiment of the present invention, the electronic incentive coupon is provided in response to a service-provider associated delay event. As would be appreciated by one skilled in the art, the business rules can be configured based on a service provider's preferences and transmission of incentives can automatically be initiated once a predetermined criterion is satisfied.

In accordance with an example embodiment of the present invention, system can analyze a stated reason of visit of the user for the appointment and categorize the stated reason of visit for the user according to pre-established classes of reasons. The categorizing can be within the pre-established classes of reasons initiates at least one of a computationally facilitated telephone contact of the user by the service provider and an automated dispatch of emergency medical services to a geospatial location of the user.

In accordance with an example embodiment of the present invention, historical appointment information can be obtained and utilized by the scheduling optimization system 100 to further optimize appointment scheduling. The scheduling optimization system 100 can track and store prior visit durations for particular consumers, reasons for visits for the consumers, prior visit durations based on particular reasons for visits or procedures, etc. As would be appreciated by one skilled in the art, the historical information can be obtained directly from the scheduled appointments and/or through manual entry on one of the edge-connected device(s) 14. Utilizing the tracked and stored historical information, the scheduling optimization system 100 can determine whether larger or small appointment slots are necessary when scheduling further appointments for particular consumers or procedures. For example, the scheduling optimization system 100 can perform lexical analysis of schedules appointments and/or requests to identify a consumer's reason for a visit. As would be appreciated by one skilled in the art, any text recognition and analysis methodology known in the art can be utilized. In accordance with an example embodiment of the present invention, the system can dynamically model prior visit durations of one or more users for stated reasons to assist with a time block requirement for scheduled future appointments. Additionally, the historical appointment information can be obtained and utilized by the scheduling optimization system 100 to categorize and prioritize consumer visits according to priority levels. For example, particular predetermined reasons for visits can be categorized as urgent and/or medical emergency visits and can prioritize the consumer associated with the urgent and/or emergency reasons for the visit.

In accordance with an example embodiment, historical and/or current appointment information can be obtained and utilized by the scheduling optimization system 100 to initiate additional steps based on predetermined rule criteria based on an analysis of the historical and/or current appointment information. The additional steps can include instructing a service provider to initiate a request for additional information, initiate an emergency response, initiate contact with a caregiver, etc. For example, the additional steps can instruct a service provider or automatically initiate a telephone call to a consumer to further ascertain acute health status and patient condition. Similarly, the additional steps can instruct or automatically initiate dispatch of emergency medical services to the known geospatial location of the customer. As would be appreciated by one skilled in the art, the predetermined rule criteria can be stored and initiated automatically by the scheduling optimization system 100.

Figure 3A:
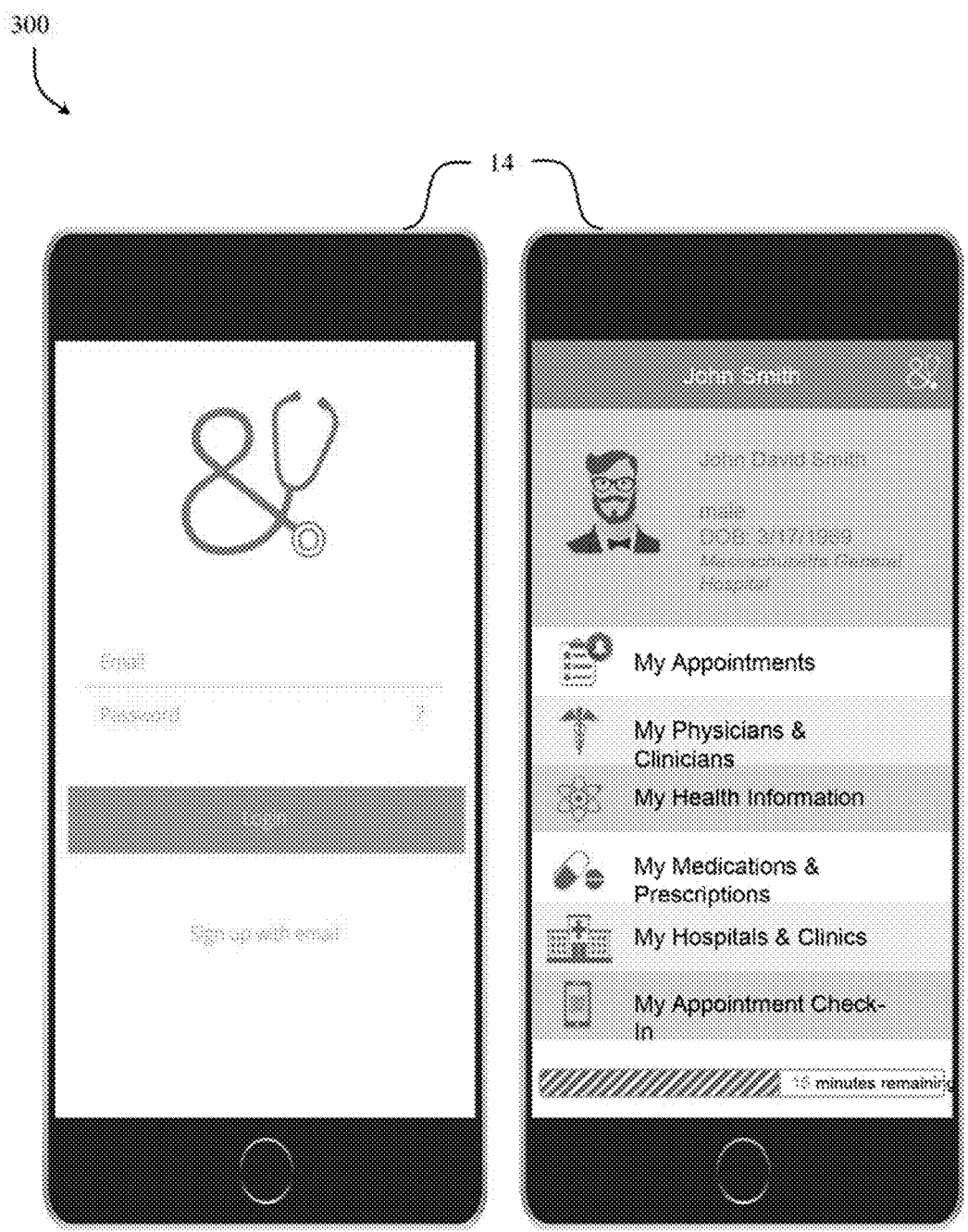
FIGS. 3A, 3B, and 3C are graphical representations of the self-service interface for the scheduling appointments in the scheduling optimization system, in accordance with aspects of the invention.
Figure 3B:
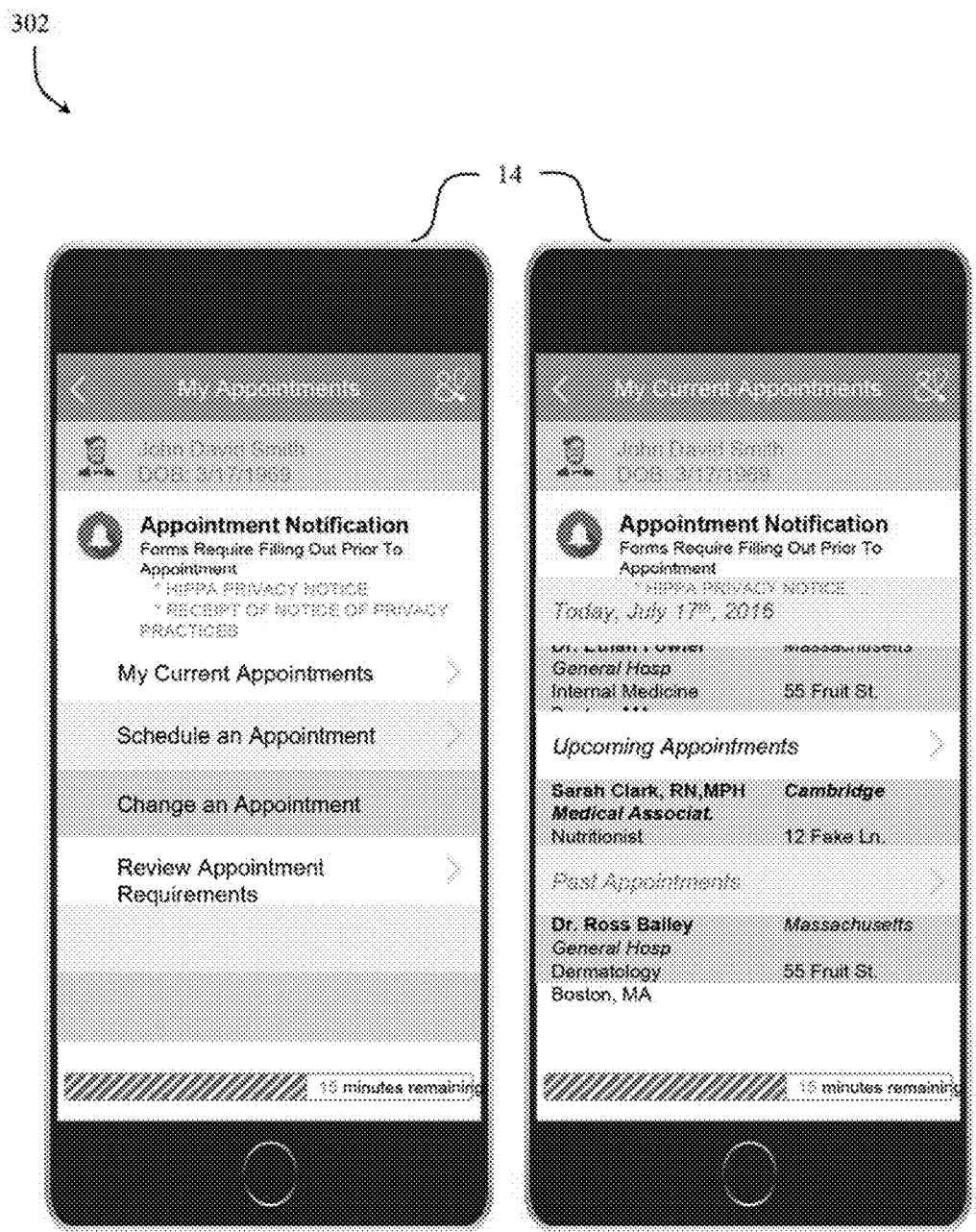
Figure 3C:
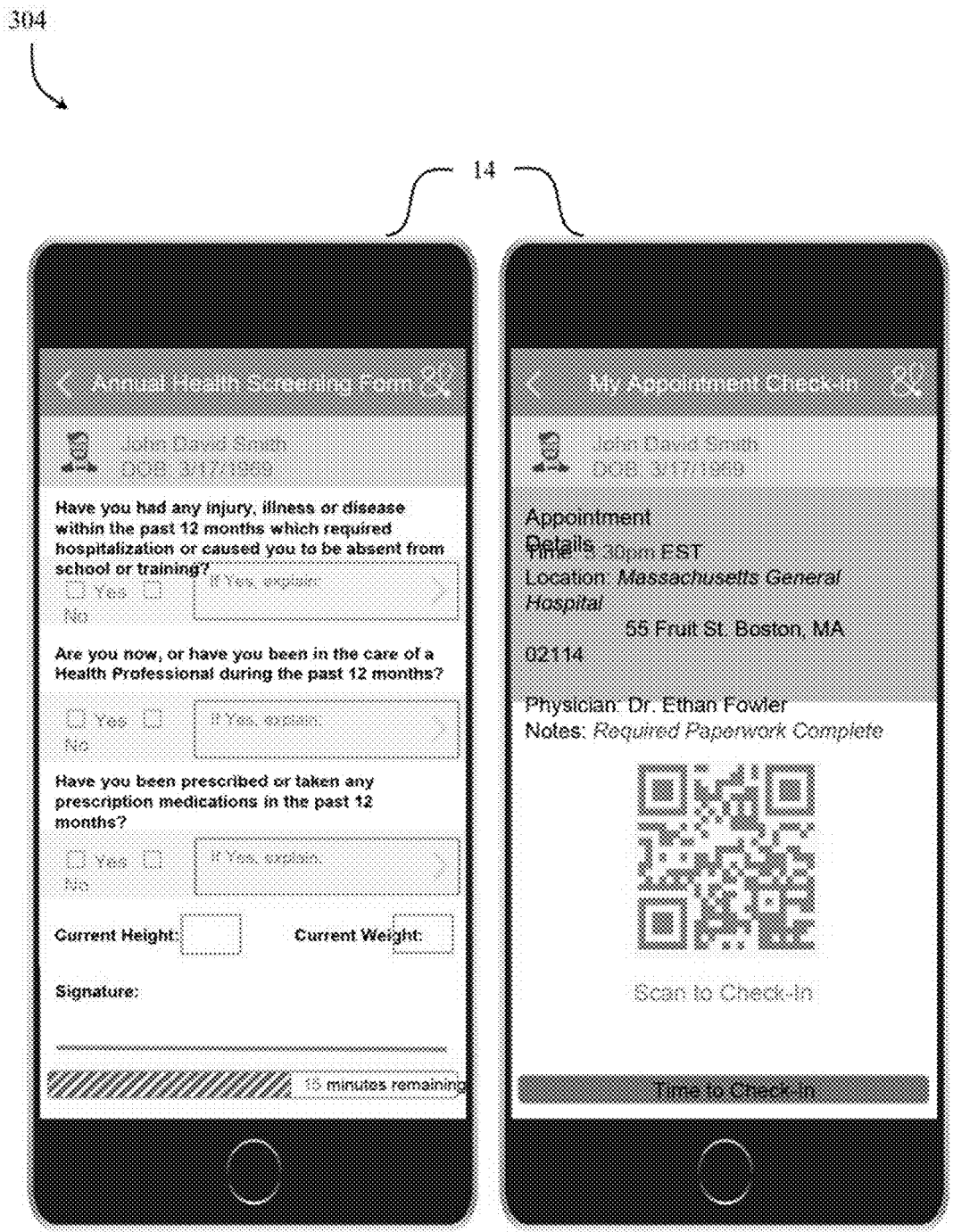

FIGS. 3A, 3B, and 3C show exemplary user interfaces 300, 302, 304 used by the user controlled edge-connected devices (e.g., edge-connected device(s) 14) to dictate the scheduling with the passive, peer-validated data store 10. The user interfaces depict a login and scheduling information that the user can use to actively schedule appointments according to their preferences, in accordance with the present invention. The interfaces in FIGS. 3A-3C show the operations that can be used to control the steps as discussed with respect to FIGS. 1 and 2.

Figure 4:
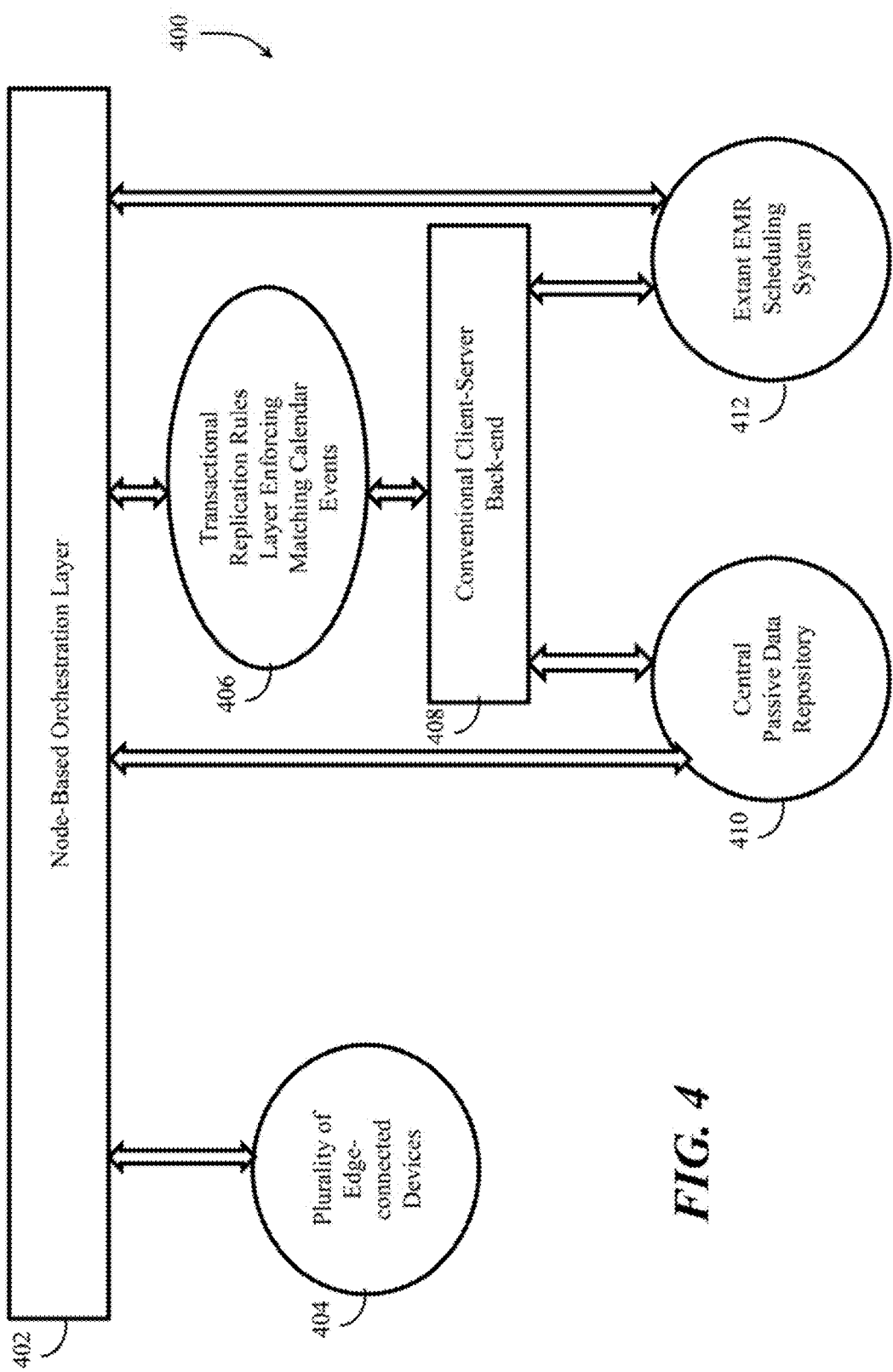
FIG. 4 is a diagrammatic illustration of a high level architecture for implementing a hybrid process in accordance with aspects of the invention.

FIG. 4 depicts an example hybrid use-case 400, in which this solution may be realized as a scheduling component of an enterprise's already extant and conventional, client-server-based scheduling solution. In particular, FIG. 4 depicts a hybrid calendaring orchestration model 400 for updating event logs. The hybrid use-case includes a node-based orchestration layer 402, a plurality of edge-connected nodes 404 (e.g., edge-connected device(s) 14), transactional replication rules layer for enforcing matching calendar events 406 (e.g., schedule changes), a conventional client-server back-end 408, a central passive data repository 410 (e.g., the passive, peer-validated data store 10), and an extant electronic health record (EHR) scheduling system 412. When deployed as a hybrid transactional model 400, as depicted in FIG. 4, scheduling requests from and scheduling updates to edge-connected nodes 404 are handled in parallel with the following partitioning of effort: 1) requests are actuated upon the central passive repository 410 in the usual manner (e.g., as discussed with respect to FIGS. 1-3C) and in tandem, 2) are forwarded to the extant enterprise EHR scheduling system 412 via a separately instantiated message bus, that is compatible with the service classes advertised by that foreign system's schema and associated message broker. Similarly, for EHR-originated scheduling requests and updates, all EHR-internally-generated transactional logs are replicated and forwarded, via a bridging interface layer 406, to the edge-connected transaction layer 402, where in turn such messages can be propagated to the plurality of edge-connected nodes 404. In such an overall manner, the above contrivance assures that at all times the EHR-contained scheduling data is in synchrony with that contained among the plurality of edge-connected nodes 404, and vice versa, and finally, that the central passive data repository 10 is similarly in synchrony with both solutions. In accordance with an example embodiment of the present invention, the extant scheduling system 412 operates in the capacity of its being a single attached device (e.g., passive peer-validated data store 10), from a plurality of concurrently attached devices (e.g., edge-connected device(s) 14), to the invention under description herein. By use of this hybrid model 400, the functionality set forth in the claims of this patent can operate seamlessly with any preexisting conventional scheduling solution already in place at a given locale.

Figure 5:
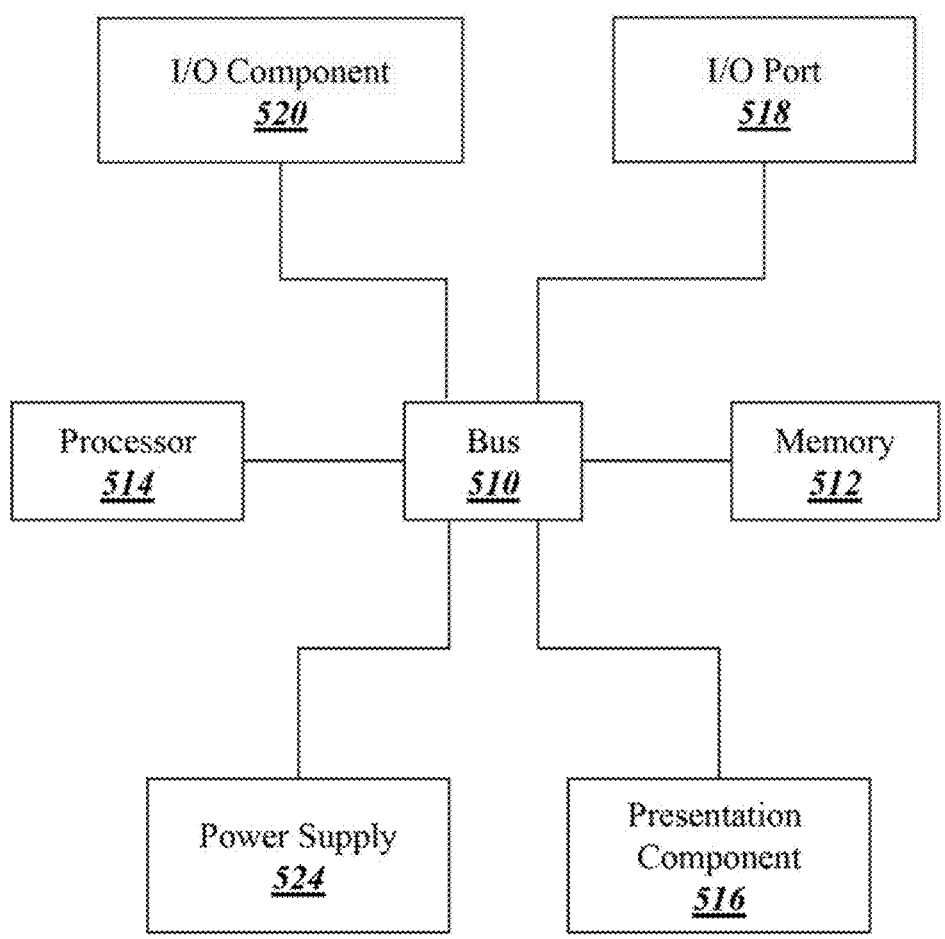
FIG. 5 is a diagrammatic illustration of a high level architecture for implementing processes in accordance with aspects of the invention.

Suitable computing devices can be used to implement the computing devices 10, 12, 14 and methods/functionality described herein. One illustrative example of such a computing device 500 is depicted in FIG. 5. The computing device 500 is merely an illustrative example of a suitable computing environment and in no way limits the scope of the present invention. A "computing device," as represented by FIG. 5, can include a "laptop," a "desktop," a "hand-held device," a "mobile device," a "tablet computer," or other computing devices with the primary function relative to the interaction with the present inventive system as a data store, as would be understood by those of skill in the art. Given that the computing device 500 is depicted for illustrative purposes, embodiments of the present invention may utilize any number of computing devices 500 in any number of different ways to implement a single embodiment of the present invention. Accordingly, embodiments of the present invention are not limited to a single computing device 500, as would be appreciated by one with skill in the art, nor are they limited to a single type of implementation or configuration of the example computing device 500.

The computing device 500 can include a bus 510 that can be coupled to one or more of the following illustrative components, directly or indirectly: a memory 512, one or more processors 514, one or more presentation components 516, input/output ports 518, input/output components 520, and a power supply 524. One of skill in the art will appreciate that the bus 510 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 5 is merely illustrative of an exemplary computing device that can be used to implement one or more embodiments of the present invention, and in no way limits the invention.

The computing device 500 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 500.

The memory 512 can include computer-storage media in the form of volatile and/or nonvolatile memory. The memory 512 may be removable, non-removable, or any combination thereof. Exemplary hardware devices are devices such as hard drives, solid-state memory, optical-disc drives, and the like. The computing device 500 can include one or more processors that read data from components such as the memory 512, the various I/O components 516, etc. Presentation component(s) 516 present data indications to a user or other device. Exemplary presentation components include a display device, speaker, printing component, vibrating component, etc.

The I/O ports 518 can enable the computing device 500 to be logically coupled to other devices, such as I/O components 520. Some of the I/O components 520 can be built into the computing device 500. Examples of such I/O components 520 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations.

As utilized herein, the terms "about" and "approximately" are intended to cover variations that may existing in the upper and lower limits of the ranges of subjective or objective values, such as variations in properties, parameters, sizes, and dimensions. In one non-limiting example, the terms "about" and "approximately" mean at, or plus 10 percent or less, or minus 10 percent or less. In one non-limiting example, the terms "about" and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A scheduling optimization system, the system comprising:

a passive peer-validated data store and a central database operating in a passive mode, the central database storing a central appointment master calendar;

an edge-connected schema defined by distributed consumer computing devices present in applications executing on a plurality of edge-connected devices comprising consumer edge-connected devices in a collective adjudicative role, wherein the collective adjudicative role validates any posted scheduling requests via a majority quorum protocol to exclude requests that are not authorized or legitimate, and the collective adjudicative role peer-authorizes requests by new edge-connected devices to access an edge-connected network;

a distributed computation database where all edge-connected schema queries, insertions and updates are carried out via rules and actions initiated from the plurality of edge-connected devices, with the passive peer-validated data store remaining in the capacity of a transaction listener and transaction processor, with no operational rules being executed on the passive peer-validated data store, and wherein one or more edge-connected devices of the plurality of edge-connected devices comprising consumer edge-connected devices perform computational tasks, including execution of instructions managing or updating the central appointment master calendar and processing or enforcing the operational rules in place of the passive peer-validated data store;

an assemblage of scheduling rules that are distributed through the plurality of edge-connected devices, that enable an execution for query and update operations on the central appointment master calendar;

an assemblage of the distributed consumer devices that interactively apply distributed scheduling rules to dynamically arrive upon an optimal scheduling solution for the central appointment master calendar, thereby maximizing any number of pre-defined overall schedule attributes;

an assemblage of edge-connected rules that allow for a continuously updating the central appointment master calendar on the central database.

2. The system of claim 1, wherein users are enabled by the system to select optimal available appointment times, in real-time, by virtue of an instantiation of complete scheduling rules set on a respective edge-connected device of the plurality of edge-connected devices.

3. The system of claim 1, wherein the plurality of edge-connected devices implement processes of maintaining a centrally-placed calendar, without requirement of central rules-based database services.

4. The system of claim 1, wherein a plurality of prioritization rules distributed to the plurality of edge-connected devices, independent of the need for central schema, enforce orchestration, facilitating a true distributed computational model in real-time, based on collective knowledge of the edge-connected schema.

* * * * *